(12) United States Patent
Pinnaka et al.

(10) Patent No.: US 12,306,737 B2
(45) Date of Patent: May 20, 2025

(54) REAL-TIME REPORT GENERATION

(71) Applicant: Microsoft Technology Licensing, LLC, Redmond, WA (US)

(72) Inventors: Syam B. Pinnaka, Seattle, WA (US); Jeffrey S. Pinkston, Draper, UT (US); Loretta M. Macklem-Clements, Redmond, WA (US); Ramya Chitrakar, Bellevue, WA (US); Xichun Xu, Sammamish, WA (US); Rohit Saraswat, Redmond, WA (US); Sangeetha M. Visweswaran, Woodinville, WA (US); Jeffrey P. Cole, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 369 days.

(21) Appl. No.: 17/826,970

(22) Filed: May 27, 2022

(65) Prior Publication Data
US 2023/0385173 A1 Nov. 30, 2023

(51) Int. Cl.
*G06F 11/34* (2006.01)
*G06F 11/30* (2006.01)

(52) U.S. Cl.
CPC ...... *G06F 11/3476* (2013.01); *G06F 11/3006* (2013.01); *G06F 11/3409* (2013.01)

(58) Field of Classification Search
CPC .............. G06F 11/3006; G06F 11/328; G06F 11/3409; G06F 11/3452; G06F 11/3476; G06F 2201/86

(Continued)

(56) References Cited

U.S. PATENT DOCUMENTS 9,842,017 B1 * 12/2017 Zhang ................... G06F 11/079
10,771,562 B2   9/2020 Desai et al.

(Continued)

OTHER PUBLICATIONS

"Value Types and Metric Kinds", Retrieved from: https://web.archive.org/web/20220318032313/https:/cloud.google.com/monitoring/api/v3/kinds-and-types, Mar. 18, 2022, 3 Pages.

(Continued)

*Primary Examiner* — Lisa M Caputo
*Assistant Examiner* — Joshua L Forristall
(74) *Attorney, Agent, or Firm* — Schwegman Lundberg & Woessner, P.A.

(57) ABSTRACT

Methods, systems, and computer programs provide real-time report generation. A baseline report is generated based on data, collected by a collector computing device, for events of a first event type for a period. The method receives a request from a user to present an updated report with real-time information that comprises events of the first event type during and after the period. The method further includes accessing configuration data that identifies which event types are enabled for real-time reporting for the user. When the updated report is available in real-time for the user, an event-update request is sent to the at least one device for unreported events. The new events of the first event type are received, and the updated report is generated by aggregating data from the baseline report and the received new events. Further, the method includes causing presentation of the updated report on a user interface.

17 Claims, 8 Drawing Sheets

(58) Field of Classification Search
USPC .......................................................... 702/186
See application file for complete search history.

(56) References Cited

U.S. PATENT DOCUMENTS

| | | | | |
|---|---|---|---|---|
| 10,938,948 | B2 | 3/2021 | Foulkes et al. | |
| 11,178,014 | B1 | 11/2021 | Sevce et al. | |
| 11,245,714 | B2 | 2/2022 | Weingarten et al. | |
| 11,755,559 | B1* | 9/2023 | Tankersley | G06F 16/2358 707/694 |
| 2010/0167658 | A1* | 7/2010 | Hoffman | H04W 24/08 455/67.11 |
| 2018/0027088 | A1* | 1/2018 | Zou | G06F 11/3082 709/224 |
| 2018/0173603 | A1 | 6/2018 | Diwakar | |
| 2020/0028782 | A1 | 1/2020 | Li et al. | |
| 2021/0034495 | A1 | 2/2021 | Venkatraman et al. | |
| 2021/0209562 | A1 | 7/2021 | Lange et al. | |
| 2022/0335023 | A1* | 10/2022 | Knox | G06F 8/77 |
| 2023/0145535 | A1* | 5/2023 | Hatamizadeh | G06N 3/02 514/460 |

OTHER PUBLICATIONS

"What is diagtrack.dll?", Retrieved from: https://www.file.net/process/diagtrack.dll.html?msclkid=b92bf509a63411ecb9e-7978f73cf6c26, Retrieved on: May 13, 2022, 3 Pages.

Jordan, Josephine, "Is Diagtrack A Keylogger?", Retrieved from: https://www.computerforensicsworld.com/is-diagtrack-a-keylogger-2/?msclkid=b92c48aca63411ecab0cd2bd79c34f47, Dec. 4, 2021, 11 Pages.

Mandalika, et al., "Troubleshoot Microsoft Defender for Endpoint onboarding issues", Retrieved from: https://docs.microsoft.com/en-us/microsoft-365/security/defender-endpoint/troubleshoot-onboarding?msclkid=65adf8bfa65c11ecab37ae129ca01873&view=o365-worldwide, Mar. 26, 2022, 47 Pages.

Parker, Shawn, "What is DiagTrack? Can You Disable It?", Retrieved from: https://yoodley.com/diagtrack/?msclkid=b92b4137a63411ecab6e94d803749b4f, Jun. 10, 2021, 11 Pages.

Stewart, et al., "Endpoint Analytics Data Collection", Retrieved from: https://docs.microsoft.com/en-us/mem/analytics/data-collection, Apr. 6, 2022, 4 Pages.

Tibbetts, Timothy, "How to Disable Connected User Experiences and Telemetry", Retrieved from: https://www.majorgeeks.com/content/page/how_to_disable_diagnostics_tracking_(diagtrack)or_connected_user_experiences_and_telemetry.html?msclkid=b92c2a59a63411ecb0fd1ccc433096cd, Oct. 26, 2019, 3 Pages.

"International Search Report and Written Opinion Issued in PCT Application No. PCT/US23/020091", Mailed Date: Sep. 1, 2023, 12 Pages.

* cited by examiner

TABLE DEFINING AVAILABLE PRIORITY EVENTS BY CUSTOMER ⸺ 602

| USER ID | SLICE 1 | SLICE 2 | SLICE 3 | SLICE 4 | SLICE 5 | SLICE 6 | SLICE 7 | SLICE 8 |
|---|---|---|---|---|---|---|---|---|
| 1 | 1 | 0 | 1 | 1 | 0 | 1 | 0 | 1 |
| 2 | 0 | 1 | 0 | 0 | 1 | 1 | 0 | 1 |
| 3 | 1 | 0 | 1 | 0 | 0 | 0 | 0 | 1 |
| 4 | 0 | 0 | 0 | 0 | 0 | 0 | 0 | 1 |
| 5 | 1 | 0 | 1 | 0 | 1 | 0 | 0 | 1 |
| 6 | 0 | 0 | 0 | 0 | 1 | 0 | 0 | 1 |
| 7 | 1 | 0 | 0 | 0 | 0 | 0 | 0 | 1 |
| 8 | 1 | 1 | 1 | 1 | 1 | 1 | 0 | 1 |
| 9 | 0 | 0 | 0 | 0 | 0 | 0 | 0 | 0 |
| 10 | 0 | 1 | 0 | 0 | 0 | 0 | 0 | 0 |
| 11 | 0 | 1 | 0 | 0 | 0 | 0 | 1 | 0 |
| 12 | 1 | 0 | 0 | 0 | 0 | 0 | 0 | 0 |

FIG. 6

REAL-TIME REPORT GENERATION

TECHNICAL FIELD

The subject matter disclosed herein generally relates to methods, systems, and machine-readable storage media for generating reports regarding the performance of computing systems.

BACKGROUND

Management platforms for monitoring and managing computer devices often collect data from the managed devices, many times in the form of notifications of events that happened at the managed device, e.g., the device started, shut down, crashed, had network connectivity problems, detected that an application was installed or started, had a new user login, had a configuration change, etc. A typical computing device may report from one to fifty different types of events or more.

Oftentimes, the management platform creates reports based on the events received, and the number of daily events can be in the order of a hundred million. Therefore, it often takes a long time to generate the reports for all the devices and all the clients using the management platform.

Sometimes, a user may want to get status information on a particular device, but the available information only covers events that happened previously, e.g., the day before, because the reports were generated in batch mode the previous night. The user would like to get real-time information, but it may be difficult to generate this real-time information for multiple reasons, such as the device has not reported all the events that happened during the day, the amount of computing resources to generate the report is large, etc.

Further, some reports require the analysis of multiple types of events, and the combination of possible events can quickly grow exponentially. Thus, generating reports for all types of combinations is prohibitively expensive in the use of computing resources.

Therefore, a system that can generate real-time reports on computer device performance will be very useful, especially in platforms with a large number of devices.

BRIEF DESCRIPTION OF THE DRAWINGS

Various of the appended drawings merely illustrate example embodiments of the present disclosure and cannot be considered as limiting its scope.

FIG. 6 is a table for determining which events are configured for prioritized real-time reporting, according to some example embodiments.

DETAILED DESCRIPTION

Figure 1:
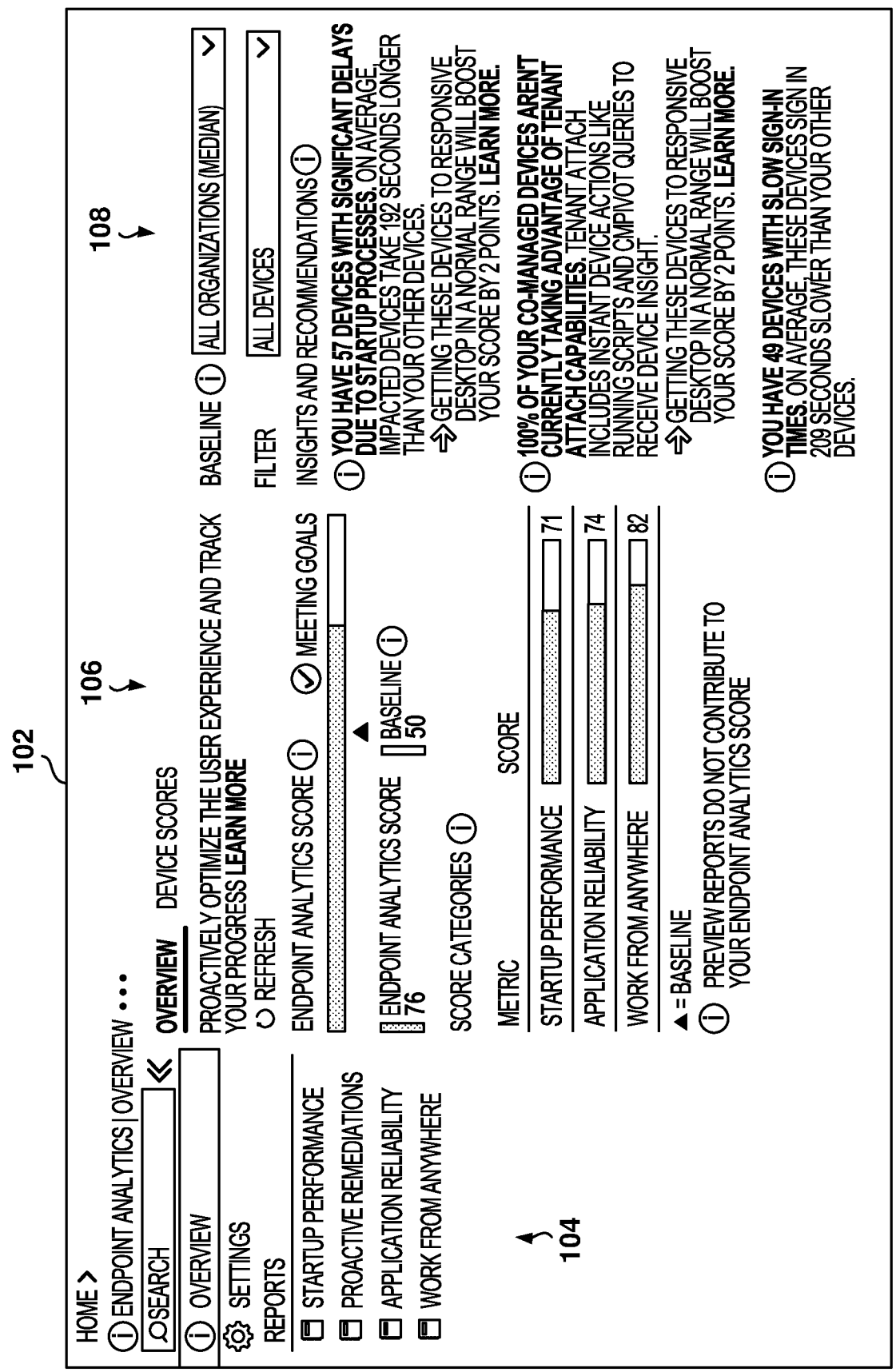
FIG. 1 is a user interface for presenting a performance report, according to some example embodiments.

Example methods, systems, and computer programs are directed to real-time report generation. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, a management platform is configured for providing real-time reports that include real-time information. To provide real-time reports, a technique is developed for retrieving real-time information from managed devices, and then combining the information from previously-calculated baseline reports with the new retrieved information from the managed devices.

Additionally, given the large number of possibilities for combining multiple parameters in the report, the system allows users to configure a predetermined number of event types for generating real-time reports. Thus, each user of the system is able to select those event types more relevant to its operations. By limiting the amount of event types, the management platform is able to reduce the number of possible real-time reports and be able to plan for the adequate amount of computing resources required to support all customers.

Additionally, some event types may affect the results of multiple reports. The management platform is able to leverage the aggregation information calculated for one event in one report and used the information to simplify the generation of other reports that utilize the same event type. The presented embodiments improve data accuracy by getting real-time data to perform diagnosis in system, so problems are diagnosed faster, and the performance of the computing environment is improved.

One general aspect includes a method that includes an operation for generating a baseline report based on data, collected by a collector computing device, for events of a first event type received from at least one device for a predetermined period of time. Further, the method includes an operation for receiving a request from a user to present an updated report with real-time information. The real-time information comprises information about events of the first event type during and after the predetermined period of time. The method further includes operations for accessing configuration data that identifies which event types are enabled for real-time reporting for the user, and for, based on the configuration data, determining if the updated report is accessible in real-time for the user. When the updated report is available in real-time, an event-update request is sent to the at least one device for unreported events of the first event type. Further, the method includes operations for receiving new events of the first event type in response to the event-update request, and for generating the updated report by aggregating data from the baseline report and the received new events of the first event type, the updated report comprising newer data than the baseline report. Further, the method includes causing presentation of the updated report on a user interface.

FIG. 1 is a user interface (UI) 102 for presenting a performance report, according to some example embodiments. As used herein, a report is a statement containing information regarding a particular scenario that includes at least one computing device. The information may be based on one or more events that take place in at least one managed device, and the information may also include calculations (e.g., scores) based on the data extracted from events that take place in the at least one managed device.

The UI 102 is a sample report generated by Microsoft Endpoint Manager (MEM)™, but the embodiments described below may be applied to any management platform. MEM is a cloud-based solution that is designed to address the challenges associated with deploying, managing and securing devices in the enterprise. This includes servers, PCs, and mobile devices. IT administrators are able to create policies for personal devices being used to access an organization's applications and data. MEM includes Microsoft Intune, which is a tool for mobile device management and mobile application management. Intune is a cloud-based solution that allows administrators to configure and secure iOS, Android, MacOS and Windows devices, and can be used to manage the deployment of applications in managed devices.

Intune provides reports about device compliance, device health, and device trends. In addition, users can create custom reports for specific types of data. The report types are categorized into four areas: operational, organizational, historical, and specialist.

The operational reports provide information on the operations of managed devices. The organizational reports provide a broader summary of an overall view of the infrastructure, such as device management state. The historical reports provide patterns and trends over a period of time. Further, the specialist reports allow the use of specific event data to create custom reports.

The illustrated report on FIG. 1 is for startup performance and provides information about boot time, that is, the amount of time that it takes a device to boot up. The area 104 provides a menu for selecting from the available reports. Further, the area 106 provides the details for the selected report. In this case, a boot score is provided for starting a device. The example shows a score of 76, which is better than the baseline score of 50. Three different metrics are presented: startup performance, application reliability, and work from anywhere. For each metric, perspective scores are provided.

Further, area 108 provides additional information for configuring the baseline, filters for the reports, and additional insights and recommendations for the user.

Another sample report may indicate that several managed devices are running slow because they have hard drives instead of SSDs. The report may provide an insight to recommend that, by changing the devices from hard drives to SSDs, the productivity will improve by 10 percent.

The management platform provides slice tags that can be configured for each device. A slice tag is an identifier or code that is applied to one or more devices to group the devices as one sliceable set, referred simply as a slice. Reports are then generated for each slice to get performance metrics associated with the devices in the slice.

Many customers want to obtain these reports by slice in real time, but the number of slices may be too great for the system to be able to create all the reports in due time. The criteria to compute the subset of devices is an important measure that is correlated directly with the cost needed to compute the metrics and insights for the reports. The correlation between slicing criteria and cost of computation is exponential as different combinations of slicing criteria grows exponentially. Assuming a maximum of 100 slice tags per device, and if the system were to process all possible combinations of these 100 slice tags, it would result in $2^{100}$ or 1,267,650,600,228,229,401,496,703,205,376 (approximately 1 nonillion) slices.

The problem becomes even more complex if the slicing method is extended to other dimensions, e.g., OS version, device manufacturer, application version, application author. As the cardinality of the possible values increases with more dimensions, the number of slices grows exponentially. To illustrate this exponential growth, let us assume that the system is computing sliced reports on a data set with just two dimensions like disk type and manufacturer. Disk type has a cardinality of two (e.g., SSD and HDD) which will result in a total of 4 ($2^2$) slices. Assuming the manufacturer parameter has a cardinality of 10, it will result in $2^{10}$ combinations, or twenty billion slices. Combing disk type and manufacturer will result in $2^2 \cdot 2^{10}$, or 80 billion slices for each customer.

As seen in this example, the computational cost for sliced reports is very large so organizations often choose to compute a set of these reports in a batch process with a fixed recurring schedule (e.g., once a day, once a week, once a month) based on the desired spending.

Embodiments presented allow for the creating of real-time sliceable reports that balance the computational cost with the number of slice dimensions.

Figure 2:
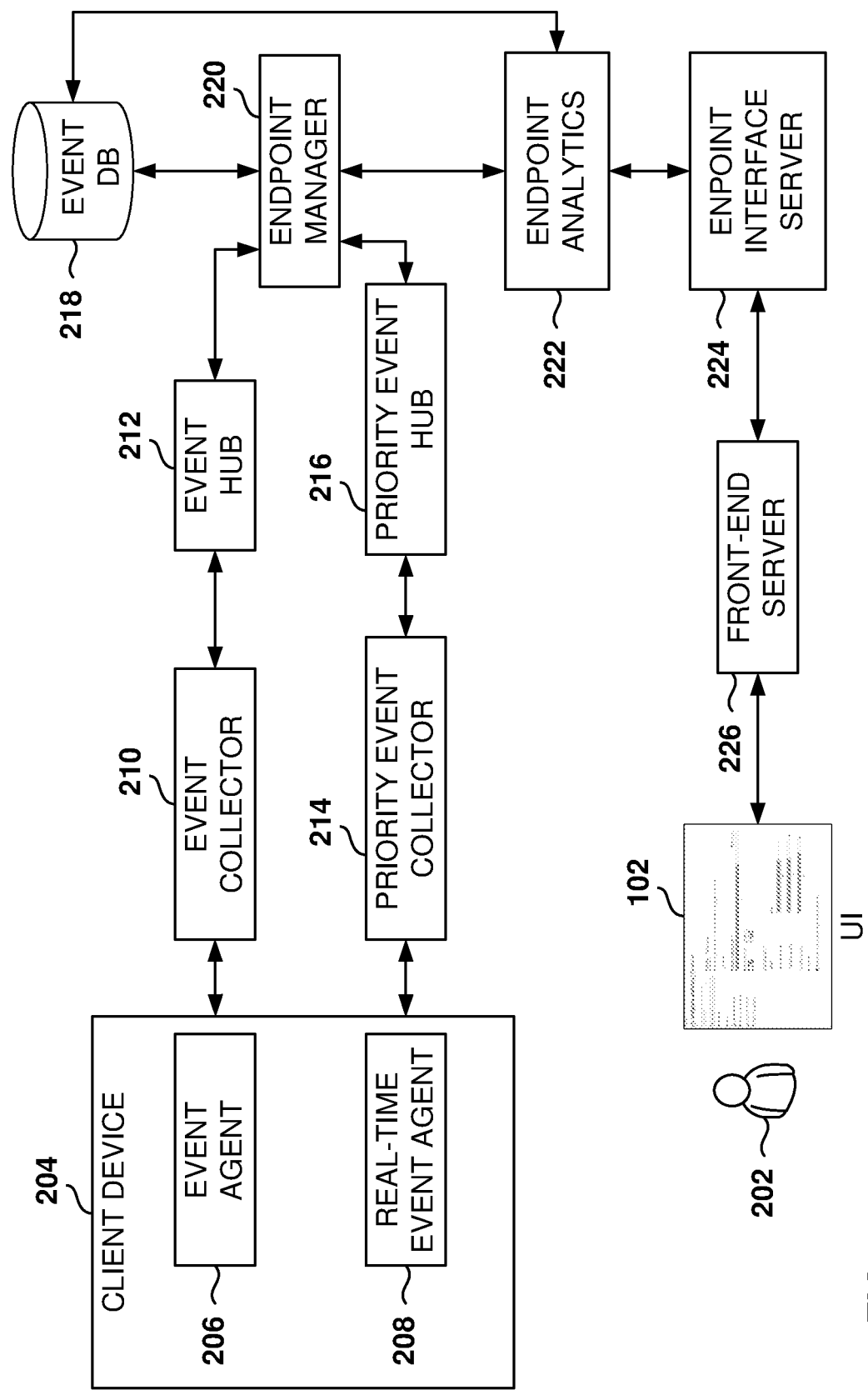
FIG. 2 is an exemplary system architecture for generating endpoint insights, according to some example embodiments.

FIG. 2 is an exemplary system architecture for generating endpoint insights, according to some example embodiments. An endpoint manager 220 manages the operations associated with the management platform, such as collecting events from client devices 204, providing a UI 102 for interacting with the system (e.g., to configure management options, access reports, add custom events, add custom slices), generating the reports, etc. Some of the embodiments are described with reference to client devices utilizing a Windows™ operating system, but the same principles may be a utilize for any other type of devices, such as Apple, Android, Linux, etc.

During normal operations, an event agent 206 at the client device sends event data to the endpoint manager 220 via an event collector 210 that receives the events. The event collector 210 stores the received events in an event hub 212. One example of an event agent 206 is an Intune-management-extension agent, which is a program installed on the computer device for collecting events. Another type of agent is the Client Configuration Manager (CCM) from Microsoft.

At some point, the events in the event hub 212 are then transferred to an event database 218 that stores the events for all the client devices. The event agent 206 may send the events at any time, may buffer events to transmit multiple events together, may send events right after they happen, or send events on a scheduled window of time. In some embodiments, the event agent 206 sends the events right after the events take place or within a predetermined period of time. For example, the events may be sent bundled every hour or every night.

An endpoint analytics module 222 analyzes the event data and generates reports and insights. An endpoint interface server 224 provides the UI 102 to the user 202 for interfacing with the management platform. A front-end server 226 may be used to provide the management tool that provides the UI 102.

A real-time event agent 208 in the client device 204 is configured to send events, but the real-time event agent 208 is also configured to receive requests for updates on unreported events. For example, when a real-time report is requested, the endpoint manager 220 sends a request to the real-time event agent 208, and the real-time event agent 208 will check all the events that are queued for transmission and then send all the queued events. This way, the endpoint manager 220 is able to invoke the endpoint analytics module 222 to generate the report with the up-to-date data.

A priority event collector 214 interacts with the real-time event agent 208 to gather events, which are then stored in a priority event hub 216, and eventually transferred to the event database 218.

Some of the attributes for the collected events include scope tags, OS version, manufacturer, etc. The events can be downloaded via two different channels, where the first channel transmits the events periodically and this first channel is characterized as a slow channel. The second channel is an on-demand channel to collect real-time events, and the second channel is referred to as the fast channel.

When generating the real-time reports, the endpoint analytics module 222 may access the data from the event database 218, the event hub 212, and the priority event hub 216 to generate the reports.

Figure 3:
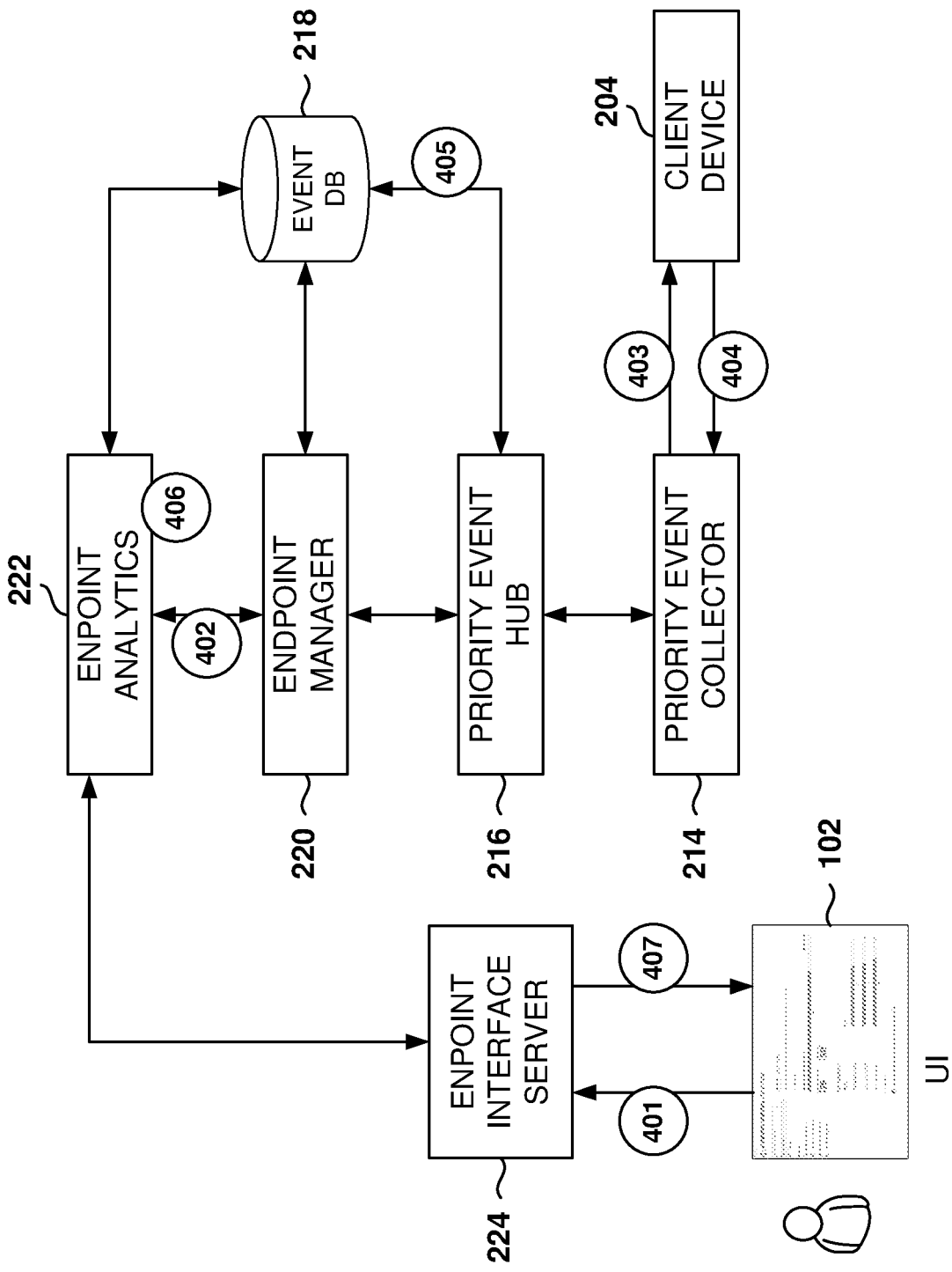
FIG. 3 illustrates the process for generating real-time reports based on real-time collection of event data, according to some example embodiments.

FIG. 3 illustrates the process for generating real-time reports based on real-time collection of event data, according to some example embodiments. At operation 401, the user accesses an existing report on the UI 102. This report is called the baseline report and it was previously generated on a batch mode. For example, the baseline report was generated previously with all the information for the previous two days. Thus, the report does not cover the events that have happened since midnight. The user requests on the UI 102 to generate a real-time report with the latest data from the managed devices. The endpoint interface server 224 routes the request to the endpoint analytics module 222.

At operation 402, the endpoint analytics module 222 generates a request to the devices associated with the request for real-time uploading of the latest set of events needed for real-time metrics and insights. In some example documents, the request is for all the events that have not been reported yet by the client device 204. In other example embodiments, a period of time may be included in the request, and the client device 204 will download all the unreported events that fall within the time period. For example, if the baseline report was created for all the events before midnight, the request may include a timestamp for the midnight hour so all the events that happened after midnight are reported with high priority.

The priority event collector, at operation 403, sends the request to the real-time event agents 208 at the client devices 204 for the real-time uploading of the latest set of events. The real-time event agents 208 gather the information at the client device, and, at operation 404, downloads the requested events to the priority event collector 214. If a client device 204 has no new information related to the request, and confirmation is sent back notifying that there is no new data to report. The download events are stored at the priority event hub 216. In some embodiments, at operation 405, the downloaded events are stored in the event database 218.

At operation 406, the endpoint analytics module 222 reads the high-priority, real-time event data from the priority event hub 216 or the event database 218 and performs an aggregation of the baseline report previously created with the new downloaded information. More details about the aggregation process are provided below with reference to FIG. 4. After the aggregation is performed, at operation 407, the updated, real-time report is presented on the UI 102.

Figure 4:
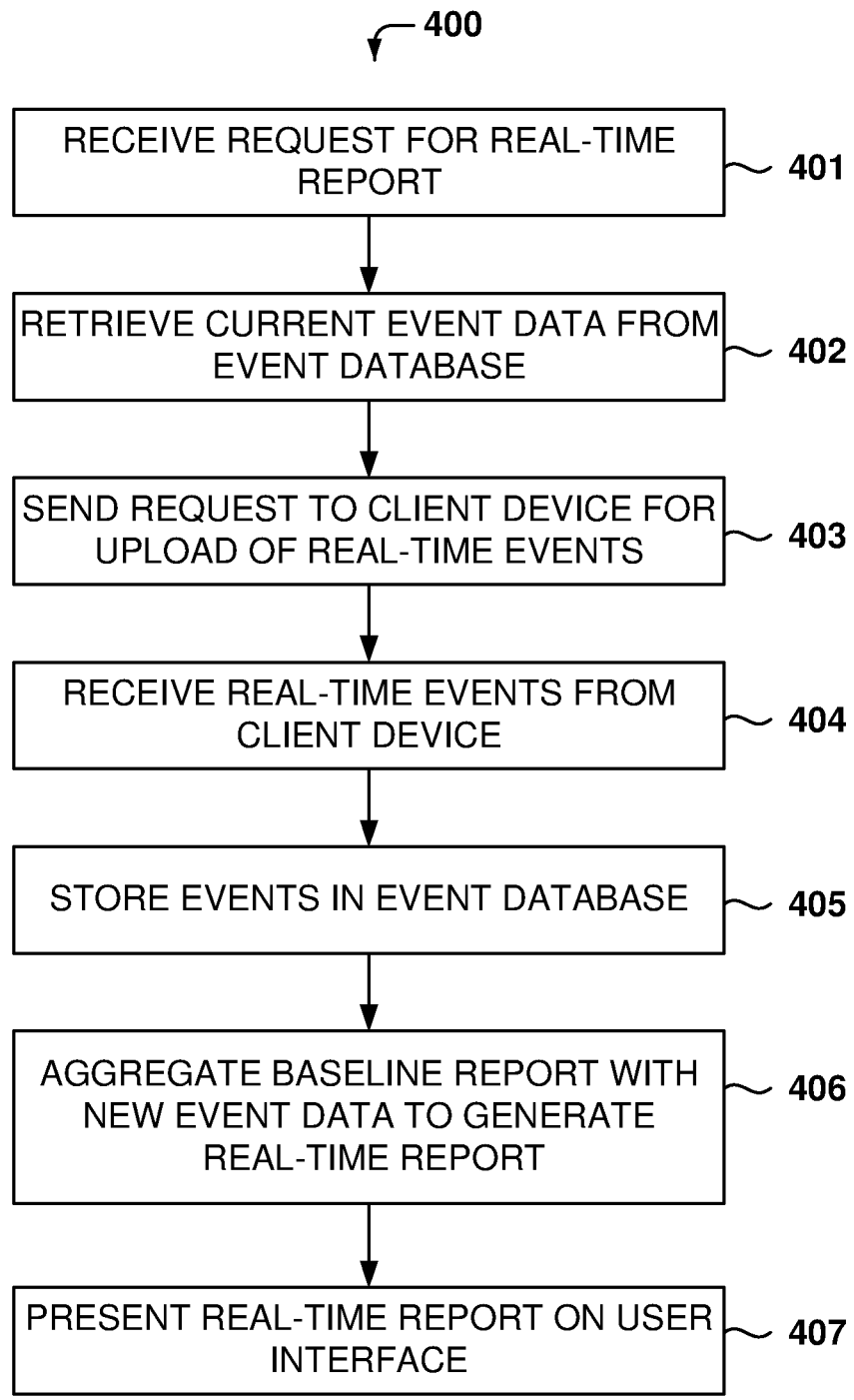
FIG. 4 is a flowchart of a method for generating the real-time reports, according to some example embodiments.

FIG. 4 is a flowchart of a method 400 for generating the real-time reports, according to some example embodiments. While the various operations in this flowchart are presented and described sequentially, one of ordinary skill will appreciate that some or all of the operations may be executed in a different order, be combined or omitted, or be executed in parallel.

Embodiments optimize the report-generation cost by combining delta-aggregations with batch aggregations, and by partitioning the aggregation workload across a small number of jobs.

Presented solutions combine batch processing with real-time reporting based on data aggregation, also referred to as delta aggregation. Delta aggregation is the process to combine (e.g., aggregate) new received information (e.g., delta data) with previous reports to generate real-time reports that reflect the collected events up to the current time. The reportable events are collected from the devices on-demand when the events are needed.

At operation 401, a request is received for a real-time report that incorporates the latest data collected by the managed devices. At operation 402, the current event data is retrieved from the event database, which also includes the baseline report that has been requested to be updated with the real-time information.

The real-time report utilizes the baseline data from the baseline report and also uses data from the managed devices that is downloaded on-demand to include the latest information. At operation 402, a request is sent to the client devices associated with the desired real-time report for the uploading of real-time events that have been not downloaded to the management platform yet.

At operation 404, the real-time events are received from one or more of the managed client devices, and those events are stored in the events database at operation 405. In some example embodiments, the events may be stored in a temporary event hub to generate the real-time report before the events are eventually stored in the events database.

At operation 406, the baseline report is aggregated with the new event data to generate the real-time report. The aggregation may be performed based on the baseline report data and other intermediate aggregations that may have been performed. Thus, the aggregation may be built on top of other previous aggregations.

While computing the aggregate data for a report, the aggregation work may be partitioned by customer based on the customer identifier (ID). This partitioning strategy reduces the number of jobs, optimizes the disk IO (input/output) operations, and reduces computing expenses for the service.

The computed aggregates are stored in memory so the aggregated data may be reused for other reports. For example, if the report requested is based on boot-time events, the aggregated data will generate one or more metrics based on the boot-time events (e.g., boot-time score, average boot-time score). Other reports that used the boot-time events can then be generated without having to get the event data from the database. This reusability can be achieved by normalizing the aggregates schema for ease of reuse for several related reports.

For the aggregations that need more than one source event information and yet real-time reporting is desired, the aggregates are merged with slowly computed batch-aggregates to update the current metrics and insights. These metrics are then be updated as other events are received so the aggregates stay current.

In one example, the report for the boot score is generated and the user wants to update the baseline boot-score report with current, unreported information. The boot score is assigned to a device from its boot events based on the amount of time the device takes to boot. In this example, the boot score varies between 0-100 for a boot time range between 18 and 120 seconds.

A device boot score is computed as an average from all the boot events in the last 30 days. A customer boot score is computed as an average of all the devices that belong to that customer.

Further, the boot scores for all customers are generated every time the report aggregation runs. Normally, boot events for call customers from all their devices in the last 30 days are considered to compute the boot scores. The management platform may be managing a large number of devices, and the volume of events to consider for the boot score reports may be in the order of tens of millions of events. Loading all these events into memory and computing the device boot scores and the tenant boot scores for all customers is computationally very expensive.

The delta aggregations simplify the calculation process by considering the new events that arrived into the system after the last aggregate computation. For example, the batch generation has computed the device boot scores and the customer boot scores and stored the scores in memory (e.g., the events database or another database).

When the same job runs the next day, instead of looking at all the data again, the job identifies the new events arrived into the system after the previous day's job run, and recalculate the boot scores. One example embodiment, the customer boot scores are calculated with the following equation:

$$CBS_t = (CBS_{t-1} \#CD_{t-1} + DBC_t \#CDNE)/CD_t \quad (1)$$

In equation (1), $CBS_t$ is the customer boot score for the present time, $CBS_{t-1}$ is the customer boot score from yesterday (t−1), $\#CD_{t-1}$ is the number of client devices yesterday (t−1), $DBC_t$ is device boot scores for new events since yesterday, #CDNE is number of devices with boot events since yesterday, and $CD_t$ is the total number of current devices.

Figure 5:
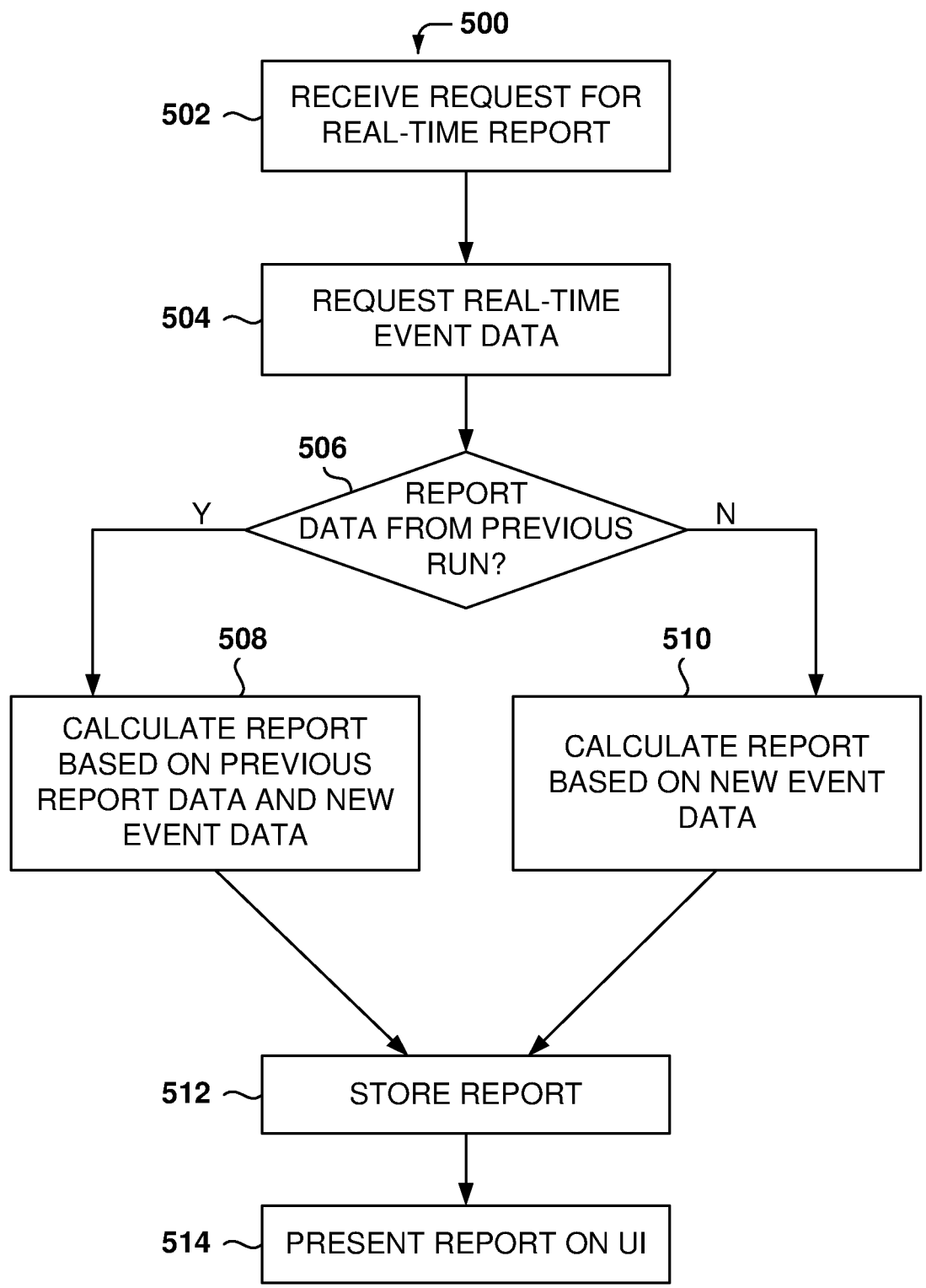
FIG. 5 is a flowchart of a method for data management when creating the real-time reports, according to some example embodiments.

FIG. 5 is a flowchart of a method 500 for data management when creating the real-time reports, according to some example embodiments. At operation 502, a request is received for a real-time report.

From operation 502, the method 500 flows to operation 504 to request real-time event data. Further, at operation 506, a check is made to determine if report data from a previous run (e.g., previous batch, previous aggregated report) is available. If the report data is available, the method 500 flows to operation 508, and if the report data is not available, the method 500 flows to operation 510.

At operation 510, a new report is calculated based on the new event data. Additionally, if there is data in the event database that has not been captured by a report, the stored data in the database is also used to make the calculations for the new report.

At operation 508, an aggregation is performed to calculate the new report based on the previous report data (e.g., baseline report), and the new event data. It is noted that there may be some events that are common among multiple reports. The data associated with each event is calculated separately (unless the report requires a combination of event data) and the calculated event metrics may be used for multiple types of reports. This way, the reporta that use shared event information may be calculated with less computing resources.

In some example embodiments, the management platform analyzes the requests submitted by users and predicts one or more reports that will likely be requested. Based on this prediction, the management platform proactively works on updating the predicted report, even if it requires sending request for updated event information from the client devices. For example, a device has 10 boot events, some crash events, and related application usage or application crash data. One report is called a device timeline that shows the sequence of events as they occurred. Those sequence of events can be pulled up from multiple sources. If the user is investigating reports associated with crushes, the management platform detects that the user will likely select the device timeline report. Thus, the management platform starts requesting updated information from the associated client devices to be prepared to perform data aggregation to generate real-time reports for the device timeline.

At operation 512, the calculated report is stored in memory, and, at operation 514, the report is presented on the UI.

In some example embodiments, the management platform is configurable to take automatic actions when a problem is found. For example, if a virtual managed device is crashing often or is having problems running some applications because of lack of memory, the management platform will automatically increase the amount of memory for the virtual device. Similar, if a virtual device is running out of disk space, the management platform will increase the amount of virtual disk storage available for the virtual device.

FIG. 6 is a table for determining which slices are configured for prioritized real-time reporting, according to some example embodiments. If all customers had the ability to slice reporting by any attribute or combination of attributes, the complexity of the system would be virtually impossible to manage. This is why, in some example embodiments, each customer has the ability to select which slices (e.g., tags) to select for high-priority reporting, which is reporting that includes obtaining real-time data from managed devices.

The management platform allows each customer to select which are the slices enabled for priority reporting. One method includes creating a table 602 by customer and slices to determine which are the prioritized slices. Each row corresponds to a different customer, and the first column is for the customer ID. The remainder of the columns is for the different slices. The corresponding cell value then indicates if the slices is prioritized (e.g., 1) or not (e.g., 0).

When a priority report is requested by a user, the table 602 is checked to determine if the slice required for the report is available for on-demand, real-time reporting, that is, high-priority events. Those events for the high-priority slices configured for real-time reporting then can be downloaded on-demand from the client devices.

Other example embodiments may utilize other data structures for configuring the slices by customer, such as an index, a hash table, a list of allowed slices by customer, etc.

The solution is designed such that slicing can be performed with any metadata attributes that the management platform can access. An example scenario is "device health-based automated deployment rings". Each deployment ring for this use case can be thought of one sliced group of devices and thus a given application or driver can be deployed automatically to the next large ring based on the health of devices in the previous deployment ring.

In some example embodiments, the number of allowed slices per customer is configurable based on the customer account, such as monthly revenue, number of minutes devices, etc. By limiting the number of slices available in the system, the management platform is able to limit the amount of computing resources required to generate insights for all the available slices of data.

In some example embodiments, a UI is provided to the customer for selected the slices available for hyper-priority reporting. The customer is able to add, delete, or change the number of slices configured.

Figure 7:
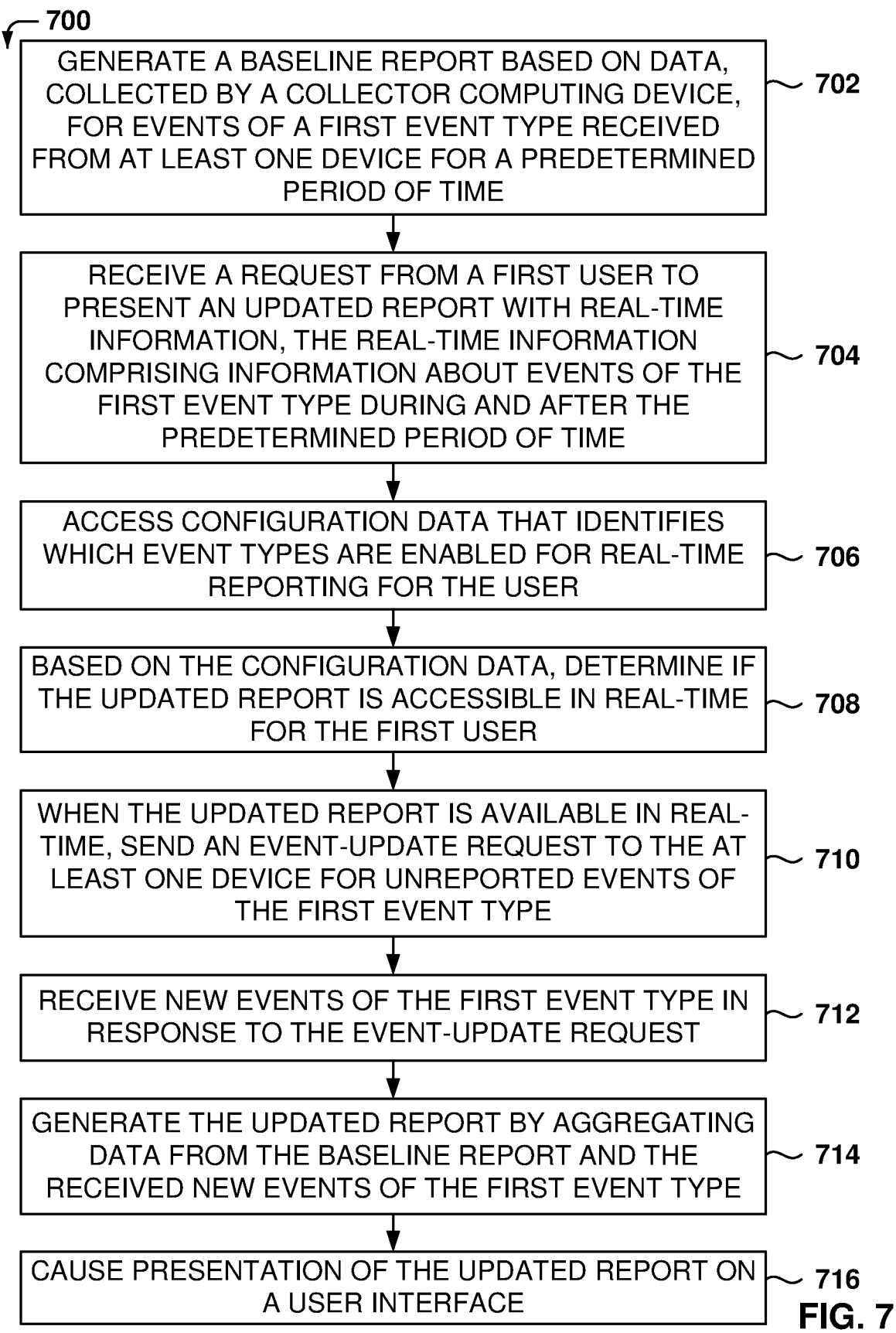
FIG. 7 is a flowchart of a method for real-time report generation, according to some example embodiments.

FIG. 7 is a flowchart of a method 700 for real-time report generation, according to some example embodiments. The computer-implemented method 700 is for troubleshooting and improving computer performance. While the various operations in this flowchart are presented and described sequentially, one of ordinary skill will appreciate that some or all of the operations may be executed in a different order, be combined or omitted, or be executed in parallel.

Operation 702 is for generating a baseline report based on data, collected by a collector computing device, for events of a first event type received from at least one device for a predetermined period of time.

From operation 702, the method 700 flows to operation 704 for receiving a request from a user to present an updated report with real-time information. The real-time information comprises information about events of the first event type during and after the predetermined period of time.

From operation 704, the method 700 flows to operation 706 to access configuration data that identifies which event types are enabled for real-time reporting for the user.

From operation 706, the method 700 flows to operation 708 where, based on the configuration data, a determination is made one whether the updated report is accessible in real-time for the user.

From operation 708, the method 700 flows to operation 710 where, when the updated report is available in real-time, an event-update request is sent to the at least one device for unreported events of the first event type.

From operation 710, the method 700 flows to operation 712 for receiving new events of the first event type in response to the event-update request.

From operation 712, the method 700 flows to operation 714 for generating the updated report by aggregating data from the baseline report and the received new events of the first event type, the updated report comprising newer data than the baseline report.

From operation 714, the method 700 flows to operation 716 to cause presentation of the updated report on a user interface.

In one example, aggregating data comprises calculating a current statistical value associated with an event type based on a previously calculated statistical value and information received in the new events for the event type.

In one example, the method 700 further comprises changing a configuration of at least one device based on information in the updated report.

In one example, the method 700 further comprises providing an option in the user interface for configuring event types that are enabled for access in real time.

In one example, the method 700 further comprises identifying a related report that is based on information about the first event type, and updating the related report based on calculations performed to generate the updated report.

In one example, a first agent in the at least one device is configured for downloading events to an endpoint manager, where a second agent in the at least one device is configured for receiving the event-update request to provide real-time event data.

In one example, the baseline report is calculated periodically in batch mode.

In one example, the user interface includes an option to request real-time information to update the baseline report.

In one example, the configuration data is stored in a table by customer identifier and by slice type.

In one example, a report is a statement containing information regarding a particular scenario that includes at least one computing device, the information based on one or more events that occur at the at least one computing device.

In view of the disclosure above, various examples are set forth below. It should be noted that one or more features of an example, taken in isolation or combination, should be considered within the disclosure of this application.

Another general aspect is for a system that includes a memory comprising instructions and one or more computer processors. The instructions, when executed by the one or more computer processors, cause the one or more computer processors to perform operations comprising: generating a baseline report based on data, collected by a collector computing device, for events of a first event type received from at least one device for a predetermined period of time; receiving a request from a user to present an updated report with real-time information, the real-time information comprising information about events of the first event type during and after the predetermined period of time; accessing configuration data that identifies which event types are enabled for real-time reporting for the user; based on the configuration data, determining if the updated report is accessible in real-time for the user; when the updated report is available in real-time, sending an event-update request to the at least one device for unreported events of the first event type; receiving new events of the first event type in response to the event-update request; generating the updated report by aggregating data from the baseline report and the received new events of the first event type, the updated report comprising newer data than the baseline report; and causing presentation of the updated report on a user interface.

In yet another general aspect, a machine-readable storage medium (e.g., a non-transitory storage medium) includes instructions that, when executed by a machine, cause the machine to perform operations comprising: generating a baseline report based on data, collected by a collector computing device, for events of a first event type received from at least one device for a predetermined period of time; receiving a request from a user to present an updated report with real-time information, the real-time information comprising information about events of the first event type during and after the predetermined period of time; accessing configuration data that identifies which event types are enabled for real-time reporting for the user; based on the configuration data, determining if the updated report is accessible in real-time for the user; when the updated report is available in real-time, sending an event-update request to the at least one device for unreported events of the first event type; receiving new events of the first event type in response to the event-update request; generating the updated report by aggregating data from the baseline report and the received new events of the first event type, the updated report comprising newer data than the baseline report; and causing presentation of the updated report on a user interface.

Figure 8:
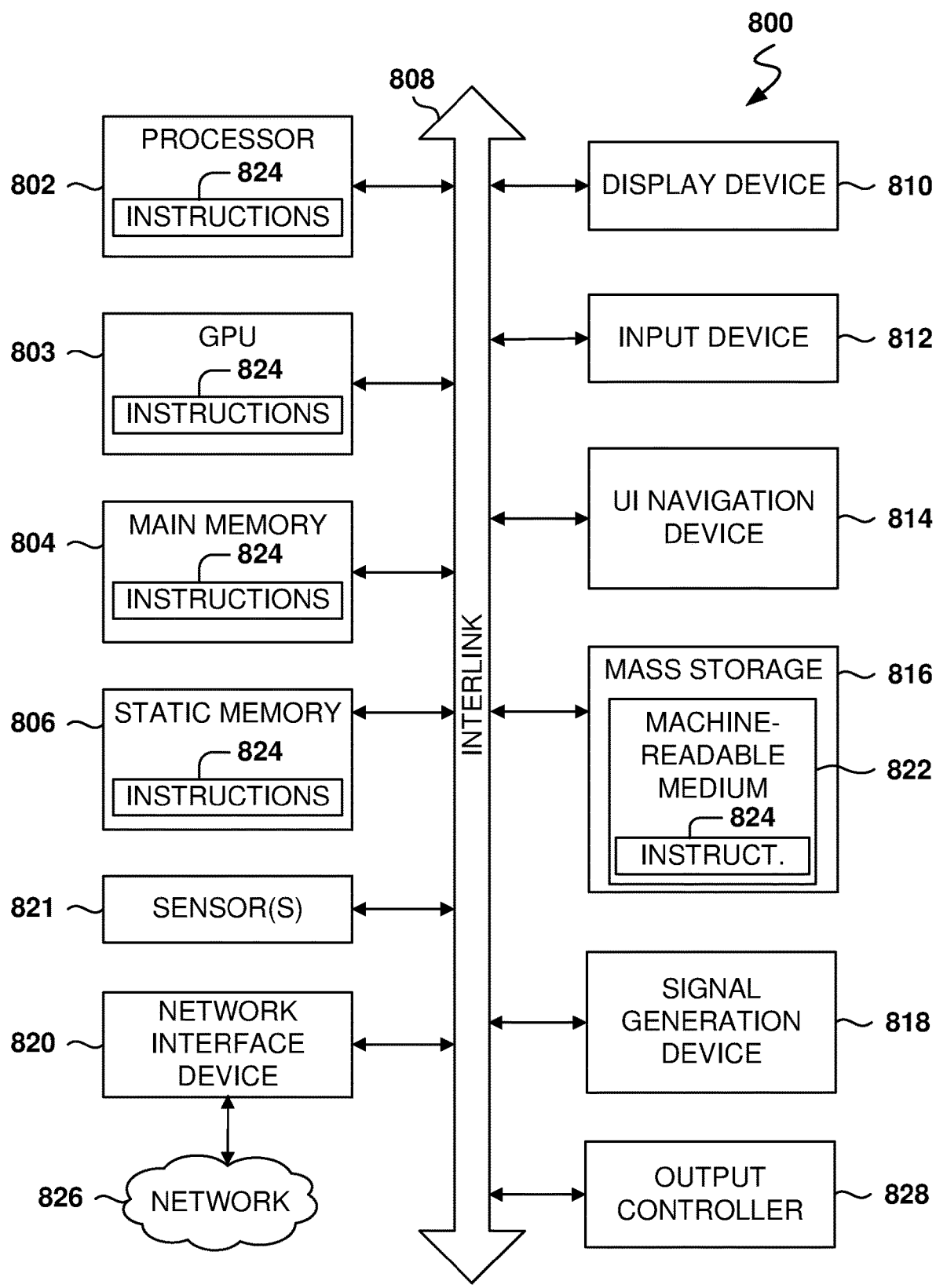
FIG. 8 is a block diagram illustrating an example of a machine upon or by which one or more example process embodiments described herein may be implemented or controlled.

FIG. 8 is a block diagram illustrating an example of a machine 800 upon or by which one or more example process embodiments described herein may be implemented or controlled. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in a peer-to-peer (P2P) (or other distributed) network environment. Further, while only a single machine 800 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 800 may include a hardware processor 802 (e.g., a central processing unit (CPU), a hardware processor core, or any combination thereof), a graphics processing unit (GPU) 803, a main memory 804, and a static memory 806, some or all of which may communicate with each other via an interlink (e.g., bus) 808. The machine 800 may further include a display device 810, an alphanumeric input device 812 (e.g., a keyboard), and a user interface (UI) navigation device 814 (e.g., a mouse). In an example, the display device 810, alphanumeric input device 812, and UI navigation device 814 may be a touch screen display. The machine 800 may additionally include a mass storage device (e.g., drive unit) 816, a signal generation device 818 (e.g., a speaker), a network interface device 820, and one or more sensors 821, such as a Global Positioning System (GPS) sensor, compass, accelerometer, or another sensor. The machine 800 may include an output controller 828, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, within the hardware processor 802, or within the GPU 803 during execution thereof by the machine 800. In an example, one or any combination of the hardware processor 802, the GPU 803, the main memory 804, the static memory 806, or the mass storage device 816 may constitute machine-readable media.

While the machine-readable medium 822 is illustrated as a single medium, the term "machine-readable medium" may include a single medium, or multiple media, (e.g., a centralized or distributed database, and/or associated caches and servers) configured to store the one or more instructions 824.

The term "machine-readable medium" may include any medium that is capable of storing, encoding, or carrying instructions 824 for execution by the machine 800 and that cause the machine 800 to perform any one or more of the techniques of the present disclosure, or that is capable of storing, encoding, or carrying data structures used by or associated with such instructions 824. Non-limiting machine-readable medium examples may include solid-state memories, and optical and magnetic media. In an example, a massed machine-readable medium comprises a machine-readable medium 822 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method for troubleshooting and improving computer performance, the method comprising:
    generating a baseline report based on data, received from a collector computing device, for events of a first event type received from at least one device for a predetermined period of time;
    receiving, from a user interface and at an endpoint manager device, a request from a user to present an updated report with real-time information, the real-time information comprising information about events of the first event type during and after the predetermined period of time;
    accessing, by the endpoint manager device, configuration data that identifies which event types are enabled for real-time reporting for the user;
    based on the configuration data, determining, by the endpoint manager device, the at least one device is accessible for on-demand, real-time reporting;
    responsive to determining the at least one device is accessible, sending, an event-update request to the at least one device for unreported events of the first event type;
    receiving, by the endpoint manager, data corresponding to new events of the first event type in response to the event-update request, the new events occurred after the predetermined period of time;
    generating the updated report by aggregating data from the baseline report and the received new events of the first event type;
    causing presentation of the updated report on the user interface; and
    causing a change of a configuration of a device of the at least one device based on the updated report.

2. The method as recited in claim 1, wherein aggregating data comprises:
    calculating a current statistical value associated with an event type based on a previously calculated statistical value and information received in the new events for the event type.

3. The method as recited in claim 1, further comprising:
    providing an option in the user interface for configuring event types that are enabled for access in real time.

4. The method as recited in claim 1, further comprising:
    identifying a related report that is based on information about the first event type; and
    updating the related report based on calculations performed to generate the updated report.

5. The method as recited in claim 1, wherein a first agent in the at least one device is configured for downloading events to the endpoint manager device, wherein a second agent in the at least one device is configured for receiving the event-update request to provide real-time event data.

6. The method as recited in claim 1, wherein the baseline report is calculated periodically in batch mode.

7. The method as recited in claim 1, wherein the user interface includes an option to request real-time information to update the baseline report.

8. The method as recited in claim 1, wherein the configuration data is stored in a table by customer identifier and by slice type.

9. The method as recited in claim 1, wherein the baseline report is a statement containing information regarding a particular scenario that includes the at least one device, the information based on one or more events that occur at the at least one device.

10. A system for troubleshooting and improving computer performance, the system comprising:
    a memory comprising instructions; and
    one or more computer processors, wherein the instructions, when executed by the one or more computer processors, cause the system to perform operations comprising:
        generating a baseline report based on data, received from a collector computing device, for events of a first event type received from at least one device for a predetermined period of time;
        receiving, from a user interface, a request from a user to present an updated report with real-time information, the real-time information comprising information about events of the first event type during and after the predetermined period of time;
        accessing configuration data that identifies which event types are enabled for real-time reporting for the user;
        based on the configuration data, determining the at least one device is accessible for on-demand, real-time reporting;
        responsive to determining the at least one device is accessible, sending, an event-update request to the at least one device for unreported events of the first event type;
        receiving data corresponding to new events of the first event type in response to the event-update request, the new events occurred after the predetermined period of time;
        generating the updated report by aggregating data from the baseline report and the received new events of the first event type;

causing presentation of the updated report on the user interface; and causing a change of a configuration of a device of the at least one device based on the updated report.

11. The system as recited in claim 10, wherein aggregating data comprises:

calculating a current statistical value associated with an event type based on a previously calculated statistical value and information received in the new events for the event type.

12. The system as recited in claim 10, wherein the instructions further cause the one or more computer processors to perform operations comprising:

providing an option in the user interface for configuring event types that are enabled for access in real time.

13. The system as recited in claim 10, wherein the instructions further cause the one or more computer processors to perform operations comprising:

identifying a related report that is based on information about the first event type; and updating the related report based on calculations performed to generate the updated report.

14. A tangible machine-readable storage medium including instructions that, when executed by a machine, cause the machine to perform operations comprising:

generating a baseline report based on data, received from a collector computing device, for events of a first event type received from at least one device for a predetermined period of time;

receiving, from a user interface, a request from a user to present an updated report with real-time information, the real-time information comprising information about events of the first event type during and after the predetermined period of time;

accessing configuration data that identifies which event types are enabled for real-time reporting for the user;

based on the configuration data, determining the at least one device is accessible for on-demand, real-time reporting;

responsive to determining the at least one device is accessible, sending, an event-update request to the at least one device for unreported events of the first event type;

receiving data corresponding to new events of the first event type in response to the event-update request, the new events occurred after the predetermined period of time;

generating the updated report by aggregating data from the baseline report and the received new events of the first event type;

causing presentation of the updated report on the user interface; and causing a change of a configuration of a device of the at least one device based on the updated report.

15. The tangible machine-readable storage medium as recited in claim 14, wherein aggregating data comprises:

calculating a current statistical value associated with an event type based on a previously calculated statistical value and information received in the new events for the event type.

16. The tangible machine-readable storage medium as recited in claim 14, wherein the machine further performs operations comprising:

providing an option in the user interface for configuring event types that are enabled for access in real time.

17. The tangible machine-readable storage medium as recited in claim 14, wherein the machine further performs operations comprising:

identifying a related report that is based on information about the first event type; and updating the related report based on calculations performed to generate the updated report.

* * * * *